United States Patent Office 3,145,111
Patented Aug. 18, 1964

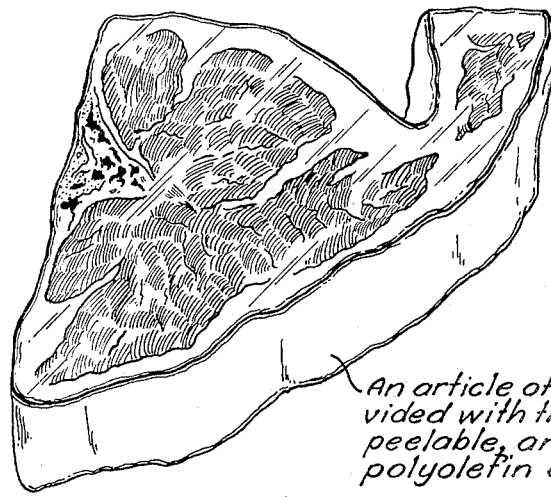
Fig. 1 — An article of meat provided with thin, tough, peelable, amorphous polyolefin coating.
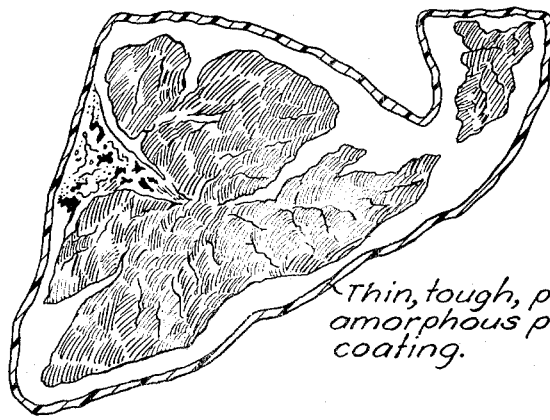
Fig. 2 — Thin, tough, peelable, amorphous polyolefin coating.
INVENTOR.
Frederick H. Norton
BY Jerome Rudy
ATTORNEY

3,145,111
COATING WITH HOT MELT $C_3$–$C_4$ POLYOLEFIN PACKAGING COMPOSITIONS AND ARTICLES OBTAINED THEREBY
Frederick H. Norton, Concord, Contra Costa, Calif., assignors to The Dow Chemical Company, Midland, Mich., a corporation of Delaware
Filed July 11, 1960, Ser. No. 42,151
23 Claims. (Cl. 99—169)

The present invention contributes to the protective coating and packaging arts and, more particularly, relates to new hot melt protective coating compositions comprising certain polyolefins, particularly polypropyline, which are adaptable for enveloping and actually packaging a wide variety of articles, particularly, in closely and tightly adhering coatings which may be easily stripped or peeled from the article.

Certain of the known protective coating compositions for foodstuffs (particularly meat and meat products) and other articles are hot melt formulations consisting essentially of a thermoplastic material (such as ethyl cellulose or polyvinyl chloride) with an oleaginous medium. The latter may be an edible oil and may also act as a lubricant and a solvent vehicle for the composition. In many instances it is desirable and advantageous to add a stabilizer or an antioxidant or both, to the composition. The lubricant in such cases is helpful for providing melts of suitable viscosities for coating applications. In addition, the lubricant is a beneficial component in order to achieve sufficient flexibility in the hardened coating as may be induced by freezing temperatures.

It is not uncommon for oil-containing coatings, even when hardened, to exude substantial quantities of oil to the article of food that is covered with the coating. Oftentimes, this may be undesirable. In certain instances (depending somewhat on the nature of the oleaginous constituent and the application intended for the coating), it may even be intolerable. While the migration of oil to the coated foodstuff (such as meat) may not be objectionable from a strictly toxicological point of view, it is frequently considered poor for aesthetic and practical reasons. As a matter of fact, such behavior may serve to restrict the complete acceptability and general marketability of the coated product.

It would be preferable if the principle (or only) ingredient of a hot melt coating (i.e., the thermoplastic material itself) were possessed of adequate self-lubricating characteristics so that it were not an absolute necessity to include on oleaginous constitutent therein. In this way, exudation and transfer of oil or other contaminants to the surface of any article enveloped by the coating material could positively be avoided.

It would be highly beneficial to have coatings that were not sticky, oily, greasy, slippery or otherwise uncomfortable to touch or difficult to grip for handling purposes.

It would be highly beneficial to be able to provide tough, closely conforming coatings constituted essentially, if desired, of only a single necessary component which would have protective and preservative value and which could be readily removed by clean and efficient stripping or peeling operations.

It would be additionally advantageous for such a coating to possess other desirable characteristics including: transparency to facilitate visual inspection and present an attractive appearance; relatively high impermeability to gases and water; and other corrosive vapors to minimize or prevent the occurrence of oxidation, dehydration, or contamination of the coated article; and flexibility over a wide temperature range, such as would be encountered in refrigeration or freezer storage and as might also be encountered in extreme warehouse storage conditions.

In addition, for obvious considerations, it would be particularly advantageous if the coating were non-toxic, i.e., free from any tendency to deposit and transfer possible deleterious materials to the coated article, particularly to meat, meat products, and other comestibles.

Therefore, it is among the principle objectives of the present invention to provide a new, only single essential component, hot melt, protective coating material for fodstuffs and other articles, as well as methods for applying and using same.

It is also among the objectives of the invention to provide new hot melt protective coating compositions that could utilize a relatively inexpensive and readily available thermoplastic material.

It is among the further objectives of the invention to provide hot melt protective coating compositions having advantages over and properties oftentimes materially superior to other coating compositions of this type.

The indicated advantages and benefits and other desirable features and objectives cognate thereto may be achieved in and with coating compostions in accordance with the present invention that are comprised essentially of a film-forming, amorphous polymer of a α-olefin monomer that contains from 3 to 4 carbon atoms (including various copolymers of such monomers) and which have molecular weights between about 15,000 and about 40,000 (as determined by the melt visocity method) and an extraordinarily low degree of crystallinity of only between about 15 and about 30 percent.

The amorphous polyolefin beneficially used as the coating material in practice of the present invention may advantageously be prepared amongst other ways, by polymerizing the olefin monomer in a xylene or other solvent in the presence of a suitable Ziegler-type catalyst system, such as a mixture of aluminum triethyl and titanium trichloride or the like. Polyolefin products from other known processes for manufacture of macromolecular olefin polymers may also be utilized in practice of the present invention. These include polyolefins polymerized under influence of such catalyst systems as chrominum oxide on silicated alumina, hexavalent molybdenum compounds and charcoal supported nickel-cobalt. Belgian Patent No. 530,617 and Canadian Patent No. 502,-597 are representative of other art that relates to suitable macromolecular polyolefins for use in practice of the present invention.

The α-olefin polymer product made in this way generally tends to separate into two phases, one of which is a glossy, amorphous product and the other a white, crystalline solid. The amorphous product is generally more suitable for and adapted to purposes of the present invention.

The coating compositions of the present invention form molten mixtures at temperatures in excess of the boiling point of water, i.e., generally in the range of from about 140° C. to about 220° C. They form clear liquids having viscosities in the indicated temperature range of from about 3500 to about 6500 centipoises. The compositions may be applied in any desired manner to articles which may be at any temperature beneath that of the hot melt.

Pressed films and dip coatings of amorphous polyolefins employed in the practice of the invention, particularly polypropylene and copolymers therefrom comprising from 70 to 100 percent solids, are generally clear, non-tacky, non-bleeding, and flexible. For example, a pressed film having a thickness of about 14 mils remains flexible even when dipped in a solution of ice and methanol at an extremely low temperature, as in the neighborhood of −17° C.

The molecular weight and the degree of crystallinity of the α-olefin polymer selected for use are critical for optimum results in practice of the invention. The ultimate coating compositions are normally sprayed in molten form or applied from a molten dip-bath. Hence, the viscosity of the molten polymer at application temperatures is very important. The viscosity is largely a function of the molecular weight of the polymer. Thus, for most efficacious application, it is desirable that the molecular weight of the polymer be between about 15,000 and about 40,000. More advantageously, the molecular weight is between about 25,000 and 35,000.

The degree of crystallinity affects, among other properties, the clarity of the ultimate coating and the properties of the film that is formed from the composition. Thus, the strength, flexibility and film tenacity, as well as ease of efficient and clean applied coating removal from the coated article, depend on this characteristic of the polyolefin employed. Most suitably, for purposes of best meeting the indicated requirements, the degree of crystallinity of the polymer that is employed should be between about 15 and about 30 percent. The greatest advantage is ordinarily obtained with crystallinities between about 20 and about 30 percent. The percentage of crystallinity is determined by X-ray analysis of press molded films of the undiluted polymer.

Advantageously, particularly when meat or meat products are involved, the coating compositions may be applied by a method which comprises freezing the article, or at least freezing the surface of the article of the meat product to be coated; and coating the frozen article with the molten composition. Such a method is beneficial in that the surface of the article being coated, particularly the surface of meat and the like, is less likely to attain discoloring temperatures. When fresh meat products are involved, this tends to more positively avoid vaporization of surface juices and loss of "bloom" (i.e., the fresh red color and natural appearance) in the meat being coated.

Any articles which are not affected by high temperatures may be satisfactorily coated with the compositions of the present invention. As a matter of fact, there are many instances where no significant advantage may be derived by chilling or freezing the article before coating. This is the case, for example, when various metal, glass, and wooden articles are being coated.

Brushing, spraying, splashing, and other techniques may be employed in order to apply the beneficial coating compositions of the invention to the articles being coated. It is generally expedient, especially because of the relatively viscous nature of the present compositions and in order to more readily meet the requirements of commercial production, to employ spray or splash coating techniques in order to manufacture the desired coated articles. By such a technique, each of the articles to be coated is passed under or over, or both, one or more non-atomizing sprays of the molten composition or through one or more curtains or sheets thereof, or is otherwise splashed thoroughly therewith, to cover its entire surface in order to effect the desired "pick-up" of the coating. After the application, the applied composition is permitted to cool and harden on the coated article.

The compositions of the present invention are actually particularly well adapted for being applied by machines which coat the hot melt over the articles as a liquid film from nozzles especially constructed and designed for the purpose. Such a method of application is especially well suited to provide economically and desirably thin, integral and uniform coatings on a rapid and expedient mass handling and production basis. Application of the hot melt by means of a liquid film or falling curtain effect provides the most advantageous results in these regards.

Thus, due to the relatively great viscosity of the present compositions, dip-coating may be an unattractive procedure for their application. Furthermore, dip-coating oftentimes tends to result in undesirably thick coating layers, especially when viscous formulations are employed and to be a less efficient method of application than machine coating. Atomized spray coating of the hot melts are oftentimes undesirable for the reason that they may cause the coating to be formed with poor integrity and coherence since the atomized hot melts do not seem to be able to fuse together well on the coated article.

A properly formulated composition should permit applied film thicknesses to be obtained by machine spray application techniques that are between about 5 and 100 mils and preferably less than about 50 mils with a single pass of the article to be coated under the falling curtain or film or other non-atomized spray of the hot melt. Of course, as can readily be appreciated generally thicker applied coatings can be obtained, if desired, especially when other coating techniques are utilized for their application. As a matter of fact, it may oftentimes be economically attractive for the thickness of the applied coatings to be in the neighborhood of 10–25 mils or so.

Coated articles in accordance with the present invention have a highly attractive and exceptionally pleasing appearance. The coating has absolute transparency over a wide temperature range and the transparency is not effected at temperatures as cold as those in the neighborhood of about −20° F. and lower. This desirable feature permits a satisfactory visual inspection and consumer appraisal to be made of the coated article.

The coating does not bleed or exude the lubricating component, if one has been included in the coating formulation. Thus, the coating is not sticky, oily, greasy, slippery or otherwise uncomfortable to touch or difficult to grip when handled. It adheres tightly as a thin, clear film about the article and conforms closely to its contours, even when the articles are irregularly shaped, including comestibles and other than food products, such as spark plugs, tools, wood carvings, or deeply embossed jewelry.

Various non-toxic antioxidants may be employed in effective stabilizing quantities in the compositions of the invention in order to inhibit oxidative degradation of the polyolefins or copolymers of such polyolefins. Typical of such antioxidants are 2,2′-methylene bis(4-ethyl-6-tert.-butylphenol), which is obtainable under the trade designation "Inhibitor 162"; 2,6-ditertiary butyl-4-methyl phenol, commercially available under the trade designation "Ionol"; and certain alkyl-substituted phenols, such as those which are obtainable under the trade designation "Santonox." Ordinarily, quantities of such materials that are up to about 2 weight percent, based on composition weight, advantageously between about 0.001 and 1 weight percent, may be employed.

Also, it may be beneficial to incorporate effective quantities of certain non-toxic color stabilizers in the compositions to facilitate the retention of a desirably clear and free-from-discoloration condition in the coating. Advantageously, the color stabilizers which may be employed include mixed organic phosphite-epoxy compounds, including those that may be obtained under the trade designation "Advastab CH–49" (a mixture of about 72 weight percent of n-butyl ester of epoxidized fatty acids and about 28 weight percent of triphenyl phosphite); and "Advastab CH–201" (a mixture of about 17 weight percent of triphenyl phosphite and about 83 weight percent of n-butyl ester of epoxidized fatty acids). Up to 10 weight percent, based on composition weight, of such additament may be employed. Advantageously, between about 0.001 and 1 or 2 weight percent of such materials are utilized.

The lubricating constituent that may be employed in the compositions of the present invention, if desired, include such oleaginous material as refined and deodorized castor oil, petrolatum, or a refined mineral oil of a paraffinic variety or an equivalent derived from a naphthenic petroleum source. It is desirable and ordinarily preferable for light color or water white mineral oils to be employed. Mineral oils having a viscosity in the range from about 80 to about 400 Saybolt units at 100° F. are ordinarily most advantageous to use. Usually, mineral oil or a refined grade suitable for use with comestibles is preferred for economic as well as technical reasons when the composition is to be employed for coating foodstuffs. However, other materials may be used, if desired. Microcrystalline waxes may likewise be employed to impart lubrication to the polymeric component of the coating. Also applicable for such purpose are normally liquid, low molecular weight polyolefins (such as polyethylene or polypropylene) when such polyolefins are of the variety known as oils. As much as about 15 to 20 percent by weight, or even more in some cases, of such oleaginous lubricants may be incorporated with advantage in the polyolefin coating compositions of the invention.

The invention is further exemplified in and by the following docent illustrations wherein, unless otherwise indicated, all parts and percentages are to be taken by weight.

Illustration "A"

Hamburger patties, cuts of steak, and portions of cheese were coated by first freezing and then dip-coating them in a hot melt at about 160° C. which was comprised of about 25 parts of an amorphous polypropylene gel having a molecular weight of about 31,000 and a degree of crystallinity of about 24 percent. The samples of meat and cheese were withdrawn from the hot melt and allowed to cool. The coated meat, as schematically illustrated in a perspective view in FIGURE 1 and in cross-section in FIGURE 2 of the accompanying drawing, had an attractive, sparkling and pleasing appearance and were not objectionable to the touch. The protective coating was transparent, non-tacky, flexible, and non-bleeding. Each of the hardened coatings adhered tightly to each of the articles and conformed closely to it as a thin, enwrapping film about its non-uniform shape. The applied films were about 30 to 50 mils in thickness and could be peeled cleanly from the articles. The coatings were pliable and tough after being dipped in an ice-methanol solution at $-17°$ C.

In addition, the strips of peeled film were capable of being remelted for additional coating operations without sacrifice of any of the original beneficial properties and quality of the coating composition.

Illustration "B"

Various cuts of meat, including steaks, chops, and roasts from beef, lamb, and pork, as well as liver, fish, bacon and several varieties of luncheon meat are coated by first freezing and then dip coating them with a hot melt at about 160° C. which is comprised of about 1.7 parts of polypropylene having a molecular weight of about 31,000 and a degree of crystallinity of about 23.9 percent; about 0.30 parts of refined mineral oil having a viscosity between about 95 and 105 Saybolt units at 100° F. (obtained under the trade designation "LOI Sonneborn"); about 0.017 part of a non-toxic, color stabilizer (a mixture of epoxidized soybean oil and triphenyl phosphite); and about 0.004 part of an antioxidant (2,2′-methylene-bis-(4-ethyl-6-tertiarybutyl phenol)).

After the dipping, the applied coating is allowed to cool and harden. The resultant coating adheres tightly to each of the articles and conforms closely to them as a thin, enveloping film about their various irregular contours. It is completely transparent, allowing visual inspection of the coated articles which retain their essential natural appearances. The coating is remarkably tough and does not become embrittled at freezing temperatures. The applied coating has an average thickness between about 30 and 50 mils and can be stripped cleanly from the articles without leaving remanents or segments of the coating adhering to the articles. The coating is neither sticky, oily, greasy, tacky nor otherwise objectionable or uncomfortable to touch or handle. And, of major significance, the coatings do not leave toxic, savorific, or solid residues when removed from the article.

Illustration "C"

A representative number of small articles, such as and including metal hand tools, silverware for table use, intricate metal appliance parts, wooden-carved statuettes, and expensive crystal glass ware were protected from damaging scratches, chipping, and discoloration by corrosive fumes in the atmosphere by means of dip-coating the articles in a hot melt at about 170° C. The hot melt coat-composition contained about 17 parts of polypropylene (of the same type as that utilized in Illustration "B"); about 3 parts of refined mineral oil ("LOI Sonneborn"); about 0.2 part of "Advastab CH–49"; and about 0.05 part of "Inhibitor 162." The mixture was heated until molten and thereafter stirred to insure a blending of all ingredients. Without being pre-chilled, a small metal wrench, a teaspoon, several metal nuts and bolts, a wooden-carved statuette, and a small crystal candleholder were dipped individually into the molten composition to a depth sufficient to immerse and completely cover the articles. The coated articles were then removed from the dipping tank and the coating so deposited was allowed to cool and harden. Results commensurate with those obtained in Illustration "B" were achieved.

Commensurate excellent results are obtained when the foregoing illustrative procedures are duplicated excepting to employ any of the other polyolefin compositions within the above delineated scope for the coating, including polybutylene and various copolymers of propylene and butylene having suitable molecular weight and low crystallinity characteristics, and when other articles and foodstuffs are coated and other applicating techniques for the coating compositions utilized.

What is claimed is:

1. Method for coating the exposed surfaces of edible animal product selected from the group consisting of meat, fish and cheese, which method comprises applying to said surfaces a hot melt of a molten composition composed of an essentially amorphous polymer of an $\alpha$-olefin monomer of 3 to 4 carbon atoms, said polymer having a molecular weight of from about 15,000 to about 40,000 and a degree of crystallinity of from 15 to 30 percent, then allowing the applied coating on the coated surfaces to cool to a hardened condition.

2. The method of claim 1, wherein the edible animal product selected from the group consisting of meat, fish and cheese is in a frozen condition during the application of coating composition.

3. The method of claim 2, wherein said edible animal product selected from the group consisting of meat, fish and cheese is meat.

4. The method of claim 1, wherein the hot melt coating composition is applied to said surfaces of said products by dip-coating the composition thereon and wherein the molten composition has a viscosity of from about 10,000 to about 1,000 centipoises in the temperature range of from 140° C. to 220° C.

5. The method of claim 1, wherein the hot melt coating composition is applied to said surfaces of said products by spray coating the composition thereover; and wherein the molten composition has a viscosity not in excess of about 5,000 centipoises.

6. The method of claim 1, wherein said edible animal product selected from the group consisting of meat, fish and cheese being coated is maintained under normal conditions of temperature and humidity prior to the application of the coating.

7. Method for coating the exposed surfaces of edible animal products selected from the group consisting of meat, fish and cheese which comprises applying to said surfaces, while the product is being maintained at a relatively low temperature, a hot melt of molten essentially amorphous polypropylene having a molecular weight of from about 25,000 to about 35,000 and a degree of crystallinity of from 20 to 30 percent; then allowing the applied coating on the coated surfaces to cool to a hardened condition.

8. Method for coating the exposed surfaces of various edible animal products selected from the group consisting of meat, fish and cheese which comprises applying to said surfaces, while said products are being maintained at a relatively low temperature, a hot melt comprised essentially of between about 80 and 85 parts by weight of essentially amorphous polypropylene having a molecular weight of from 25,000 and 35,000 and a degree of crystallinity of from 20 to 30 percent; between about 15 and about 20 parts by weight of a refined mineral oil having a Saybolt viscosity at 100° F. between about 80 and about 400 units; and respective stabilizing quantities of a non-toxic color stabilizer and a non-toxic antioxidant for the composition; then allowing the applied coating to cool to a hardened condition on said surfaces.

9. The method of claim 8, wherein the edible animal products selected from the group consisting of meat, fish and cheese are in a frozen condition during the application of the coating composition.

10. The method of claim 8, wherein said edible animal products selected from the group consisting of meat, fish and cheese being coated are maintained under normal conditions of temperature and humidity prior to the application of the coating.

11. The method of claim 8, wherein the hot melt coating composition is applied to said surfaces of said products by dip-coatnig the composition thereon and wherein the molten composition has a viscosity of from about 3,500 to about 6,500 centipoises in the temperature range from 140° C. to 220° C.

12. The method of claim 8, wherein the hot melt coating composition is applied to said surfaces of said products by spray coating the composition thereover; and wherein said composition has a viscosity at 150° C. of from about 5,000 to 2,000 centipoises.

13. A protectively coated article of manufacture comprised of a normally solid article formed of a material selected from the group consisting of wood, glass and metal having coated on the exposed surfaces thereof a tightly adhering, peelable layer of a composition comprised of an essentially amorphous polymer of an α-olefin monomer of 3 to 4 carbon atoms, said polymer having a molecular weight of from about 15,000 to about 40,000 and a degree of crystallinity of from about 15 to about 30 percent.

14. The protectively coated article of claim 13, wherein said essentially amorphous α-olefin polymer is essentially amorphous polypropylene.

15. A food package comprised of a frozen edible animal product selected from the group consisting of meat, fish and cheese having coated on the exposed surfaces thereof a tightly adhering, peelable layer of a composition comprised of an essentially amorphous polymer of an α-olefin monomer of 3 to 4 carbon atoms, said polymer having a molecular weight of from about 15,000 to about 40,000 and a degree of crystallinity of from about 15 to about 30 percent.

16. Coated meat according to claim 15.

17. The food package of claim 15 coated with essentially amorphous polypropylene.

18. Coated meat according to claim 17.

19. A food package comprised of frozen edible animal product having coated on the exposed surfaces thereof a tightly adhering, peelable layer of a composition composed of (A) from about 80 to about 85 parts by weight of an essentially amorphous polymer of an α-olefin monomer of 3 to 4 carbon atoms, said amorphous polymer having a molecular weight of from 25,000 and 35,000 and a degree of crystallinity of from about 20 to about 30 percent and (B) from about 15 to about 20 parts by weight of a refined mineral oil having a Saybolt viscosity at 100° F. of from about 80 to 400 units.

20. Coated meat according to claim 19.

21. The food package of claim 19, wherein said essentially amorphous polymer is polypropylene.

22. A protectively coated article of manufacture comprised of a normally solid article formed of a material selected from the group consisting of wood, glass and metal having coated on the exposed surfaces thereof a tightly adhering, peelable layer of a composition composed of (A) from about 80 to about 85 parts by weight of an essentially amorphous polymer of an α-olefin monomer of 3 to 4 carbon atoms, said polymer having a molecular weight of from 25,000 to 35,000 and a degree of crystallinity of from 20 to 30 percent; (B) from about 15 to about 20 parts by weight of a refined mineral oil having a Saybolt viscosity at 100° F. of from about 80 to 400 units; and (C) respective stabilizing quantities of a color stabilizer and an antioxidant for the composition.

23. The protectively coated article of claim 22, wherein said essentially amorphous α-olefin polymer is essentially amorphous polypropylene.

References Cited in the file of this patent

UNITED STATES PATENTS

| | | |
|---|---|---|
| 2,712,503 | Dyekjaer | July 5, 1955 |
| 2,909,434 | Patten et al. | Oct. 20, 1959 |
| 2,942,986 | Williams | June 28, 1960 |
| 2,951,763 | Kelly et al. | Sept. 6, 1960 |
| 2,955,043 | Rosenthal | Oct. 4, 1960 |
| 2,957,849 | Kennedy | Oct. 25, 1960 |
| 2,971,858 | Di Giulio et al. | Feb. 14, 1961 |
| 2,985,617 | Salyer et al. | May 23, 1961 |
| 2,995,452 | Odegaard et al. | Aug. 8, 1961 |
| 3,061,446 | Norman et al. | Oct. 30, 1962 |

OTHER REFERENCES

Modern Plastics Encyclopedia Issue for 1960 (September 1959), 37, 142–145.